United States Patent Office 2,917,233
Patented Dec. 15, 1959

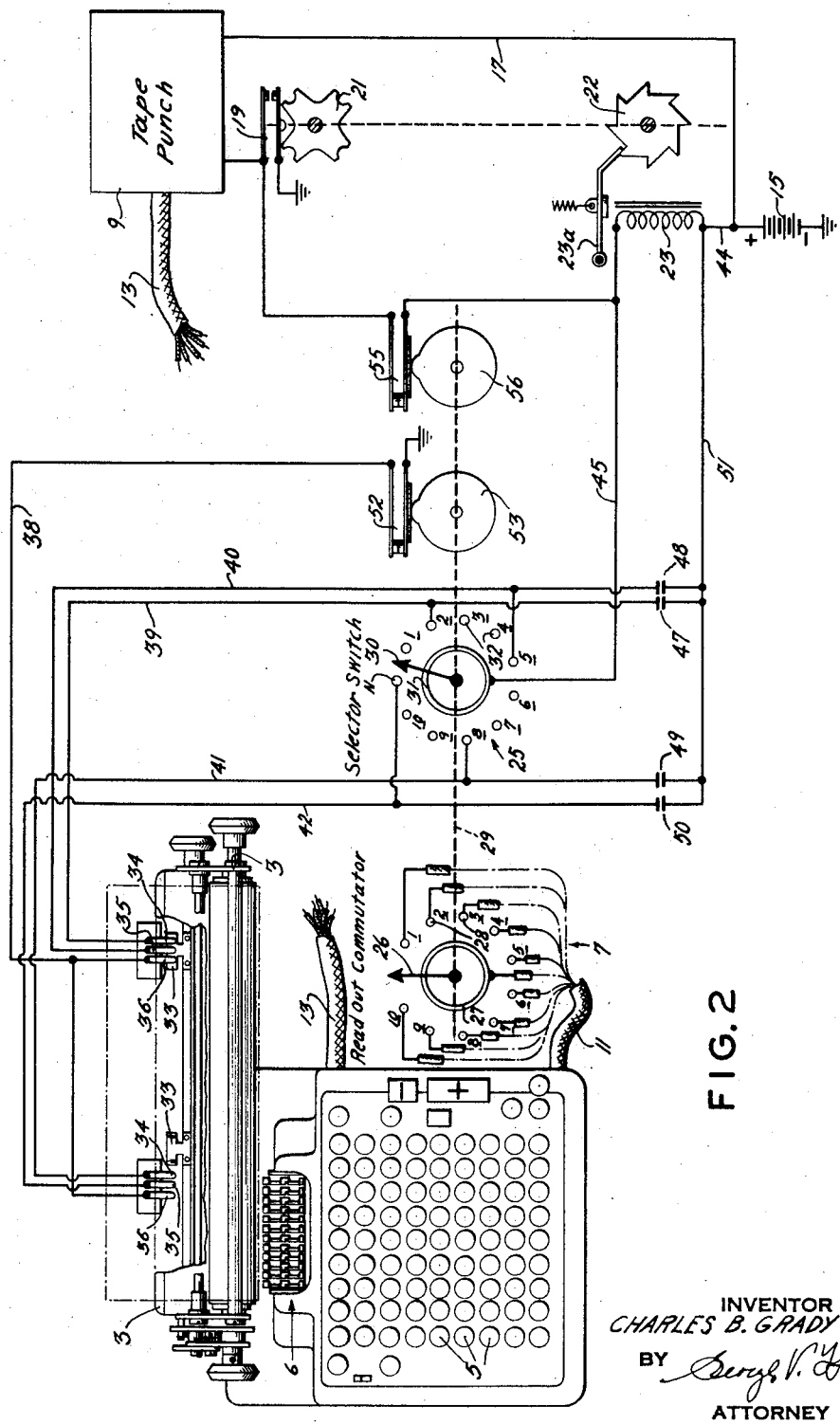

2,917,233

CARRIAGE CONTROL OF ELECTRICAL
READOUT MEANS

Charles B. Grady, Jr., West Orange, N.J., assignor to
Monroe Calculating Machine Company, Orange, N.J.,
a corporation of Delaware Application March 25, 1955, Serial No. 496,704

14 Claims. (Cl. 235—60.38)

This invention relates to the control of readout means for an accumulator of an accounting machine or the like having a shiftable carriage which may be tabulated to a plurality of preselected positions.

Well-known forms of readout means for the accumulators of accounting machines usually includes an ordinal series of storage devices which are adjusted in accordance with the registered values in the accumulator orders. Means is provided to successively sense the storage devices to control operation of a suitable electrically operated recording device such as, for example, a tape or card punch, or a magnetic recording head.

In the performance of certain calculations on an accounting machine of above noted type having a shiftable platen carriage, entries are confined to certain columnar orders of the keyboard when the platen carriage is tabulated to a given position. Printing of the value registered in the accumulator is therefore effected in the correct columnar position on the record sheet. Readout means, as noted in the foregoing, may be employed to translate the values registered in the accumulator of the machine to another medium such as, for example, a punch tape from which the information may later be transferred to a punch card. It is desirable to read out only the orders of the accumulator in which registration is effected or to read out a decimal value to only a given number of places. This will be apparent when it is considered that in punch card work, it is necessary to confine each readout to a field providing for a given number of digit and symbol registrations.

In consideration of the foregoing, this invention provides means operable in accordance with the tabulated position of the platen carriage of an accounting machine to control operation of readout means for an accumulator register of the machine. In accordance with the invention, the single movement of the platen carriage into a given position is operable in conjunction with selection devices to enable normally disabled readout means for a sequence of preselected orders of the accumulator.

In one embodiment of the invention, movement of the carriage into a given position closes switching means which, in conjunction with other switching means operable in time with the readout means, will complete suitable circuits to control enablement and disablement of the readout means for preselected orders of the accumulator. In this the basic form of the invention, it is necessary for the carriage to remain in the controlling position until completion of the readout. In another embodiment of the invention, the carriage may be tabulated to a second position before the readout is completed for the prior carriage position. This form of the invention therefore provides storage devices which are operable to control operation of the readout means after the carriage has been tabulated from the controlling position. The invention, however, will best be understood from the following description with reference to the accompanying drawings in which:

Figure 2 is a diagrammatic view similar to Figure 1 of another embodiment of the carriage position control devices.

Figure 1:
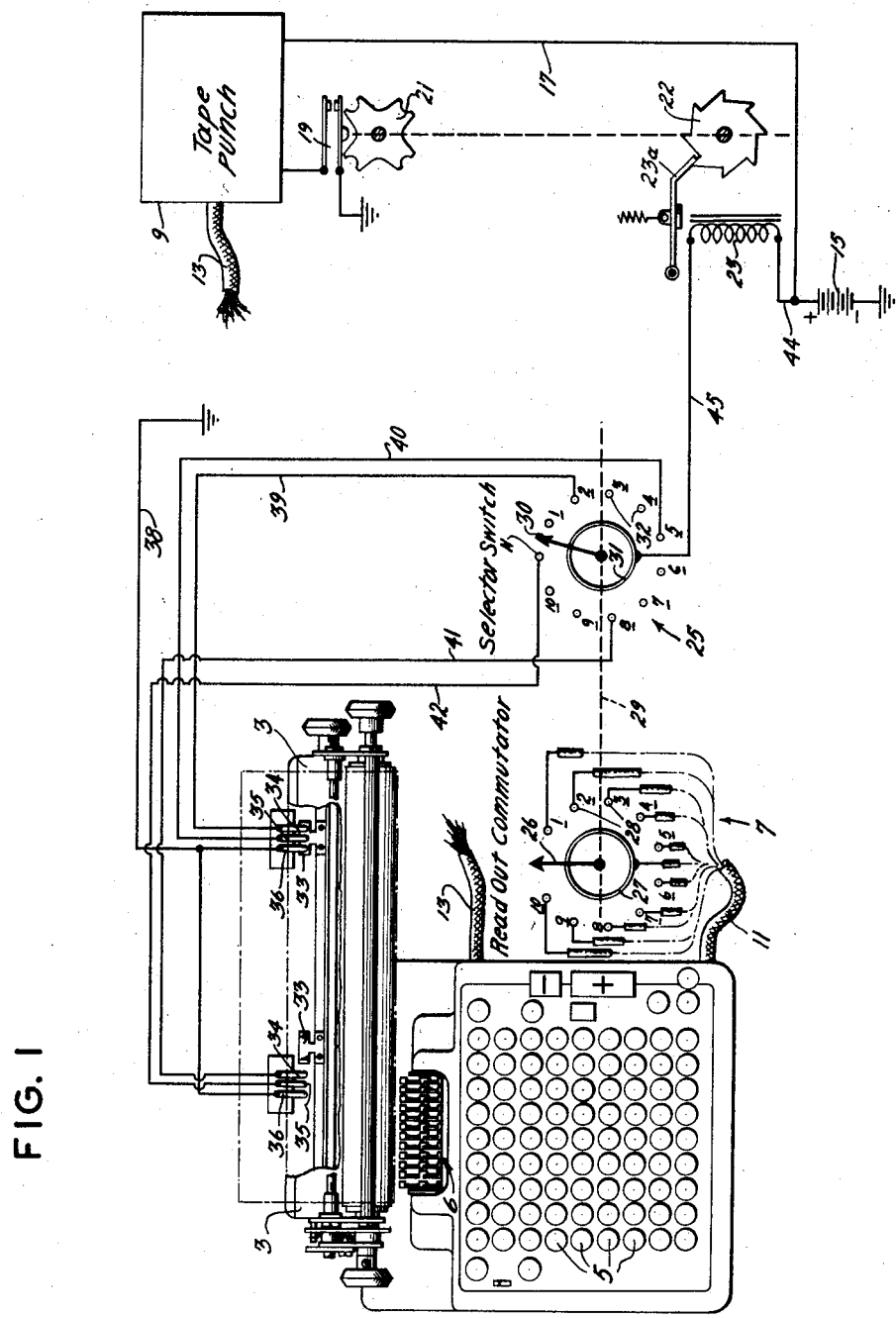
Figure 1 is a diagrammatic illustration of an accounting machine with a shiftable platen carriage and the wiring for one embodiment of the carriage position controls for the readout means.

The listing accounting machine (Figs. 1 and 2) may be of any well-known type having a shiftable platen carriage 3 which may be tabulated to a plurality of preselected positions. The machine and its principles of operations are not concerned directly with the present invention and it will be sufficient to say that amounts set up on keys 5 of the digit keyboard are accumulated in one or more registers (not shown) either additively by engagement of a register during the upward stroke, or subtractively by engagement thereof during the downward stroke of reciprocatory actuating segments. The extent of movement of each segment is determined by the value of the set digital key 5 of the corresponding key row, and type bars 6 connected with these segments are adapted to bring type of corresponding values to the printing line. The platen carriage may be tabulated successively to a number of preselected positions so that the accumulated values may be printed in any one of an equivalent number of columns of the record sheet. The registering and tabulating operations are controlled by motor power in response to depression of appropriate motor keys. An accounting machine of the above type is fully disclosed in Patent #1,946,572 issued to Loring P. Crosman and reference is made to this patent for details of the machine operation not herein disclosed.

The storage devices for the accumulated values and the means for successively sensing said devices in the readout operation are not shown in the accompanying drawings as they are only indirectly concerned with the invention. It will be understood that the readout means may be of any well-known type wherein storage devices are successively sensed either from higher to lower or lower to higher orders and wherein an appropriate electrically operated recording device is operated in response to the successive sensing operations. An example of such readout means is fully disclosed in Patent #1,834,561 issued to Thomas J. Watson wherein the storage devices are successively sensed to operate the translating and recording devices.

With reference to the drawings the successive readout of the accumulator storage devices is indicated by a commutator or selector switch 7. This commutator may be driven as fully disclosed in the aforenoted Patent #1,834,561 in time with the machine cycle to connect the sensing devices, as adjusted by the successive order storage devices, with the recording device 9. The recording device is indicated in the drawings as a tape punch. However, as hereinbefore noted, the recording device may be any one of a number of electrically operated translating units. In the drawings, the circuit connections from the readout commutator to the sensing devices (not shown) are indicated generally by the reference numeral 11, and the connections from the sensing devices to the tape punch are indicated by the reference numeral 13. A more complete showing is considered unnecessary as the control of the readout circuits in response to the sensing operations forms no part of the invention. Rather, the invention comprises means for controlling a power supply circuit to selectively render the recording device either responsive or non-responsive to the successive sensing operations of the readout means.

Power for operating punch 9 is furnished by any suitable power supply source as indicated at 15. Punch 9 is connected to one side of source 15 by a lead 17 and to the other side of the source through a normally open ground switch 19. From the above it will be noted that the sensing operations of the readout means will be rendered ineffective unless switch 19 is closed. Switch 19 is controlled by a cam wheel 21 having four equally spaced operating lobes. Cam wheel 21 is driven by a ratchet wheel 22 which is adapted to be stepped by a relay 23. Ratchet wheel 22 has eight teeth and is engaged by an operating arm 23a of the relay. When the parts are in normal position of rest as shown in the drawings, cam wheel 21 is positioned to permit switch 19 to be biased to open position. Upon energization of relay 23, arm 23a thereof will be operated to rotate ratchet wheel 22 one step of movement. This step of movement of wheel 22 will rotate cam wheel 21 to engage one of its cam lobes with the lower blade of switch 19 thereby closing said switch to enable the operating circuit for punch 9. Upon the next operation of relay 23, the cam lobe of wheel 21 will be moved from engagement with switch 19 thereby permitting said switch to be opened thereby disabling punch 9. From the above it will be noted that operation of relay 23 will alternately close and open switch 19.

Connected for operation in time with readout commutator 7 is a selector switch or commutator 25. Readout commutator 7 comprises a rotary contact arm 26 which engages a conductor ring 27. Arm 26 is rotated one complete revolution upon operation of the readout means to successively engage a series of contacts 28 which are numbered 1 to 10 in the drawings to indicate the readout connection with the successive order storage devices which will effect operation of punch 9 if said punch 9 is enabled by closure of switch 19. Contact arm 26 may be driven in time with the registering mechanism of the machine subsequent to registration in the accumulator as disclosed in connection with the commutator operation in the aforenoted Patent #1,834,561, or it may be driven by a clutch which may be engaged for a single cycle of operation under control of the registering mechanism. The arrangement whereby such a clutch may be engaged by movement of the machine parts in a registering operation is merely a matter of expedience and is not considered necessary of illustration.

Connected for rotation with commutator arm 26 by a shaft 29 is a contact arm 30 of a commutator or selector switch 25. Arm 30 engages a contact ring 31 and upon rotation with arm 26 is adapted to successively engage the contacts 32. Contacts 32 are numbered 1 to 10 to correspond with the contacts 28 numbered 1 to 10 of commutator 7. Selector switch 25, however, has an additional contact indicated N for normal as will be hereinafter described. It will be noted that contact arm 30 is positioned one half step ahead of contact arm 26 so that the respective contacts 32 will be engaged prior to the corresponding contacts 28 of commutator 7.

Longitudinally adjustable on carriage 3 are one or more contact shoes 33. Adjusted for engagement by shoes 33 are one or more groups of contacts 34, 35, 36. Upon engagement of a shoe 33 with one of the groups of contacts, the control devices will be operable to close switch 19, as hereinafter described, to enable punch 9 for operation in response to the sensing of a preselected series of the accumulator storage devices by the readout means. From the following description, it will be observed that any group of contacts 34, 35, 36 may be connected for operation in connection with selector switch 25 so that punch 9 may be enabled, when carriage 3 is tabulated to a preselected postion, for operation in response to the sensing operation of the readout means for all or any successive number of the storage devices of the accumulator.

With reference to Figure 1 of the drawings, contacts 36 of each contact group is connected to one side of power source 15 through a ground connection 38. The contact 34 of the rightmost group is connected to contact #2 of selector switch 25 by a lead 39 and contact 35 is connected to selector switch contact #5 by a lead 40. Contact 34 of the leftmost group is connected to contact #8 of selector switch 25 by a lead 41 and contact 35 is connected to contact N of the selector switch through a lead 42.

Relay 23, hereinbefore described in connection with ratchet wheel 22, is connected to one side of power source 15 by a lead 44, and as hereinafter described is adapted to be connected to the other side of the power source by a lead 45 which is connected to contact arm 30 of selector switch 25 through ring 31. The operation of the carriage controlled devices of the invention will now be described with carriage 3 in the position shown in Figure 1.

In response to a registering operation of the accounting machine, arm 26 of the readout commutator and contact arm 30 of the selector switch 25 will be rotated a complete turn as hereinbefore described. Upon engagement of arm 26 with #1 contact of commutator 7, punch 9 will not be operated because the circuit to said punch is disabled by the normally open switch 19. As hereinbefore noted, contact arm 30 is one half step ahead of contact arm 26. Therefore, prior to engagement of contact arm 26 with contact #2 of the readout commutator, contact arm 30 will engage contact #2 of selector switch 25. A circuit for relay 23 will therefore be made through lead 45, lead 39, contact 34, shoe 35, contact 36, and ground lead 38. Upon operation of relay 23 cam wheel 21 will be stepped to close switch 19 thereby enabling the punch circuit prior to engagement of arm 26 of the readout commutator with its contact #2. Furthermore, upon engagement of contacts #3 and #4 by arm 26, punch switch 19 will remain closed, and therefore the readout will also be effective to operate said punch for the corresponding storage orders. Upon movement of selector switch arm 30 to engage its contact #5, a circuit for relay 23 will be made through lead 40 and contact 35. The lobe of cam wheel 21 will now be moved from engagement with switch 19 which will be opened prior to engagement of arm 26 of commutator 7 with its #5 contact. Therefore, the punch circuit will be disabled for readout of #5 contact and the remaining orders storage devices.

When carriage 3 is tabulated leftwardly from the position shown in Figure 1 the rightmost group of contacts 34, 35, 36 will be disengaged and the leftmost group will be engaged by a shoe 33. In this case, relay 23 will be operated upon engagement of selector switch arm 30 with its contact #8 thereby closing punch switch 19 and when the contact arm engages switch contact N as it completes its operation, relay 23 will again be energized thereby opening punch switch 19. The readout will therefore be effective for orders #8, #9 and #10 and the final operation of the selector switch upon engagement of contact N will be effective to operate relay 23 so that punch switch 19 may be adjusted to normal open position.

From the above description it will be observed that platen carriage 3 must remain in a given tabulated position to control the readout means for the orders preselected for readout in association with said given position. Figure 2 of the drawings illustrates an embodiment of the invention wherein carriage 3 may be tabulated from a given position, and the readout preselected for operation corresponding to said given position will be effective subsequent to tabulation from that position.

As shown in Figure 2, storage capacitors 47, 48, 49, 50 each have one side connected in parallel to relay 23 and to one side of power source 15 by a lead 51. The other side of capacitor 47 is connected by lead 39 to contact #2 of selector switch 25 and to the rightmost carriage controlled contact 34. The other side of capacitor 48 is connected by lead 40 to selector switch contact #5 and to the rightmost carriage controlled contact 35. The other side of capacitor 49 is connected by lead 41 to selector switch contact #8 and to the leftmost carriage controlled contact 34. And the other side of capacitor 50 is connected by lead 42 to selector switch contact N and to the leftmost carriage controlled contact 35.

Carriage controlled contacts 36 which are connected to power source 15 by common ground lead 38 in Figure 1 are connected to ground by lead 38 through a normally closed switch 52 as shown in Figure 2. Switch 52 is controlled by a cam disk 53 which is fixed on shaft 29 for rotation with commutator arms 26 and 30. When the parts are in normal position (Fig. 2), a lobe of cam 53 engages and holds switch 52 in closed position. When carriage 3 is tabulated to the position shown in Figure 2, storage capacitors 47 and 48 will be charged by connection across power source 15 by lead 51 on one side and on the other side by contacts 34 and 35 respectively which are grounded through switch 52 by lead 38 and contact 36.

After a printing operation and the adjustment of the readout accumulator storage devices as an incident to a registering operation of the accounting machine, the readout operation may be initiated and carriage 3 tabulated toward the left to the next position thereby disengaging the rightmost group of contacts 34, 35, 36 and engaging the leftmost group. Tabulation of carriage 3 to the next position may be effected before completion of the readout operation. In this instance, it will be apparent that punch control relay 23 cannot be operated by circuits including switch contacts 34, 35, 36 as described in connection with Figure 1, and that storage capacitors 47, and 48, therefore, are necessary in the operation.

Upon engagement of contact #2 of selector switch 25 by arm 30 in the readout operation, capacitor 47 will be connected across relay 23 by leads 39 and 45 thereby discharging said capacitor and operating said relay to close switch 19 of the punch circuit. It will be observed that upon initial operation of the readout means, cam 53 will permit ground switch 52 to open. This will prevent charging of capacitors 49 and 50 at this time through the leftmost group of contacts 34, 35, 36 upon tabulation of the carriage into the next position. This obviously is necessary, for otherwise the readout means which is in operation for the first position of the carriage could also be effective for the second position. Furthermore, if the readout for the first carriage position were complete before tabulation from that first position, capacitors 47 and 48 would remain in charged condition upon tabulation of the carriage.

Upon engagement of arm 30 with contact #5 capacitor 48 will be discharged to operate relay 23, thereby opening punch switch 19. Upon engagement of arm 30 with contacts #8 and N, the leftmost carriage controlled contacts 33, 34, 35 which may be closed at this time, will be ineffective for the reason that ground switch 52 will be opened. However, upon movement of the parts to home position at conclusion of the readout operation for the first carriage position, switch 52 will be closed as shown in Figure 2. Capacitors 49 and 50 will therefore be charged in preparation for the readout for the second carriage position.

From the above, it will be seen that the storage devices comprising capacitors 47—50 operate to control an operation subsequent to removal of the means which enables said devices. It will be observed therefore that the principle of operation lends itself to the employment of other forms of storage devices.

It will be noted that, if during a readout operation, the power supply to relay 23 is interrupted, it would be possible for switch 19 to get out of time with the readout devices and remain closed when the readout operation is completed. If this should happen, the readout devices would obviously misoperate. In consideration of the above contingency, a safety switch 55 controls relay 23 to open switch 19 if it should remain closed at the end of a readout. Switch 55 is normally held closed by a cam disk 56 fast on shaft 29 of the readout driving means. One side of switch 55 is connected to lead 45 of relay 23 and the other side is connected to the punch side of switch 19. Should switch 19 remain closed, a circuit for relay 23 will be completed through switch 19 to operate said relay thereby opening said switch so that the parts will be restored to correct timed relation. During a readout operation, switch 55 will be permitted to open by cam 56 so as not to interfere with the normal control of relay 23.

It will be apparent to those skilled in the art that the invention is capable of modification without departing from the principles of operation. The invention is therefore to be restricted only as necessitated by the appended claims.

I claim:

1. The combination with an accounting machine having an ordinal series of storage devices, and a carriage shiftable to any one of a plurality of positions; of means operable to successively read out said series of storage devices, and means for controlling operation of said readout means comprising selection devices rendered operable in response to the single movement of said carriage into a first given position to enable and to disable said readout means to read out given orders respectively of said storage devices, and rendered operable in response to the single movement of said carriage into a second given position to enable and to disable said readout means to read out other given orders respectively of said storage devices.

2. The combination with an accounting machine having an ordinal series of storage devices, and a carriage shiftable to any one of a plurality of positions; of normally disabled means operable to read out said series of storage devices including means for successively sensing said storage devices, and means for controlling operation of said readout means comprising selection devices rendered operable in response to the single movement of said carriage into a first given position to enable said readout means prior to the sensing of a first given order storage device and to disable said readout means subsequent to the sensing of a second given order storage device, and rendered operable in response to the single movement of said carriage into a second given position to enable said readout means prior to the sensing of a third given order storage device and to disable said readout means subsequent to the sensing of a fourth given order storage device.

3. The combination with an accounting machine having an ordinal series of storage devices, and a carriage shiftable to any one of a plurality of positions; of means operable to successively read out said storage devices including an electrically operated reproducer, a power supply circuit for said reproducer, and means for controlling operation of said readout means comprising selection devices rendered operable in response to the single movement of said carriage into a first given position to close said circuit prior to the readout of a first given order storage device and to open said circuit prior to the readout of a second given order storage device, and rendered operable in response to the single movement of said carriage into a second given position to close said circuit prior to the readout of a third given order storage device and to open said circuit prior to the readout of a fourth given order storage device.

4. The combination with an accounting machine having an ordinal series of storage devices, and a carriage shiftable to any one of a plurality of positions; of means operable to read out said series of storage devices including an electrically operated reproducer, a power supply circuit for said reproducer, and means for successively sensing said storage devices to effect operation of said reproducer; and means for controlling operation of said readout means comprising a switch in said power supply circuit, selection devices rendered operable in response to the single movement of said carriage into a first given position to close said switch prior to sensing of a first given order storage device and to open said switch subsequent to sensing of a second given order storage device, and rendered operable in response to the single movement of said carriage into a second given position to close said switch prior to the sensing of a third given order storage device and to open said switch subsequent to the sensing of a fourth given order storage device.

5. The combination with an accounting machine having an ordinal series of storage devices, and a carriage shiftable to any one of a plurality of positions; of means operable to read out said series of storage devices including an electrically operated reproducer, a power supply circuit for said reproducer, and means for successively sensing said storage devices to effect operation of said reproducer; and means for controlling operation of said readout means comprising a switch in said power supply circuit, an electromagnetic device alternately operable to close and to open said switch, switching means adapted to be closed upon movement of said carriage into a given position, a commutator driven in time with the sensing operation of said readout means and operable to complete a circuit for said electromagnetic device through said switching means prior to the sensing of a given order storage device and to complete another circuit for said electromagnetic device through said switching means subsequent to the sensing of another given order storage device.

6. The combination with an accounting machine having an ordinal series of storage devices, and a carriage shiftable to any one of a plurality of positions; of means operable to read out said series of storage devices including an electrically operated reproducer, a power supply circuit for said reproducer, and means for successively sensing said storage devices to effect operation of said reproducer; and means for controlling operation of said readout means comprising a switch in said power supply circuit, an electromagnetic device alternately operable to close and to open said switch, a pair of storage capacitors, circuits for charging said capacitors including switching means adapted to be closed upon movement of said carriage into a given position, a commutator driven in time with the sensing operation of said readout means, a discharge circuit for one of said capacitors through said electromagnetic device and closed by said commutator prior to the sensing of a given order storage device, and a discharge circuit for the other of said capacitors through said electromagnetic device and closed by said commutator prior to the sensing of another given order storage device.

7. The invention according to claim 6 characterized by the provision of means for breaking said capacitor charging circuits upon operation of said readout means.

8. The invention according to claim 6 characterized by the provision of a circuit for said electromagnetic device including a normally closed switch in series with the power supply switch, and means for opening said normally closed switch upon operation of said readout means.

9. The combination with an accounting machine having an ordinal series of storage devices, and a carriage shiftable to any one of a plurality of positions; of means operable to read out said series of storage devices comprising an electrically operated reproducer, a power supply circuit for said reproducer, and means for successively sensing said storage devices to effect operation of said reproducer; and means for controlling operation of said readout means comprising a switch in said power supply circuit, an electromagnetic device alternately operable to close and to open said switch, a commutator driven in time with the sensing operation of said readout means and having a series of contacts each corresponding to one of said storage devices and each closed and opened respectively prior to and subsequent to the sensing of the corresponding storage device, switching means adapted to be closed upon movement of said carriage into a given position, a circuit for said electromagnetic device including a series connection between one of said commutator contacts and said carriage controlled switching means, and another circuit for said electromagnetic device including a series connection between another of said commutator contacts and said switching means.

10. The invention according to claim 9 characterized by the provision of a pair of storage capacitors, a circuit for charging each capacitor including said carriage controlled switching means, and a circuit for discharging each capacitor including said electromagnetic device and said one and said other of the commutator contacts respectively.

11. The invention according to claim 10 characterized by the provision of a normally closed switch common to the capacitor charging circuits and means operable upon operation of the readout means for opening said switch.

12. The invention according to claim 11 characterized by the provision of a circuit for said electromagnetic device including a normally closed switch in series with the switch of the power supply circuit, and means operable upon operation of the readout means for opening said switch.

13. The combination with an accounting machine having an ordinal series of storage devices, and a carriage shiftable to any one of a plurality of positions; of means operable to successively read out said series of storage devices, and means for controlling operation of said readout means comprising control devices operable to enable and to disable said readout means to read out given orders respectively of said storage devices, said control devices thereupon being disabled, and means operable to enable said control devices upon movement of said carriage into a given position for operation independently of the position of said carriage, said control devices including a pair of storage means for effecting the enabling and disabling operation respectively of said devices.

14. The combination with an accounting machine having an ordinal series of storage devices, and a carriage shiftable to any one of a plurality of positions; of means operable to successively read out said series of storage devices, and means for controlling operation of said readout means comprising control devices operable to enable and to disable said readout means to read out given orders respectively of said storage devices, said control devices thereupon being disabled, and means operable to enable said control devices upon movement of said carriage into a given position for operation independently of the position of said carriage, said control devices including a pair of storage capacitors for effecting the enabling and disabling operations respectively of said devices and said means operable to enable said control devices comprising means for charging said capacitors.

References Cited in the file of this patent

UNITED STATES PATENTS

| | | |
|---|---|---|
| 1,332,961 | Tanner | Mar. 9, 1920 |
| 2,211,165 | Robinson et al. | Aug. 13, 1940 |
| 2,272,590 | Swartzel | Feb. 10, 1942 |
| 2,288,846 | Schremp | July 7, 1942 |
| 2,394,637 | Schneider | Feb. 12, 1946 |
| 2,403,005 | Lake | July 2, 1946 |
| 2,451,631 | Moellenbeck et al. | Oct. 19, 1948 |
| 2,660,369 | Schulz | Nov. 24, 1953 |
| 2,709,040 | Waldbergen | May 24, 1955 |
| 2,714,985 | Saxby et al. | Aug. 9, 1955 |
| 2,728,521 | Benson et al. | Dec. 27, 1955 |
| 2,771,599 | Nolde et al. | Nov. 20, 1956 |